United States Patent [19]
Nawata

[11] Patent Number: 5,640,672
[45] Date of Patent: Jun. 17, 1997

[54] COMMUNICATION SYSTEM FOR VARYING TIMING OFFSET TO ACCOMMODATE VARIATION IN PROPAGATION DELAY

[75] Inventor: Hizuru Nawata, Tokyo, Japan

[73] Assignee: NEC Corporation, Tokyo, Japan

[21] Appl. No.: 455,208

[22] Filed: May 31, 1995

[30] Foreign Application Priority Data

Jun. 1, 1994 [JP] Japan .................................. 6-119928

[51] Int. Cl.$^6$ .................................................. H04B 7/185
[52] U.S. Cl. ........................... 455/12.1; 455/67.5; 455/69
[58] Field of Search .................................. 455/13.1, 13.2, 455/12.1, 69, 67.5, 51.1

[56] References Cited

U.S. PATENT DOCUMENTS 4,346,470  8/1982  Alvarez, III et al. .................... 370/104

FOREIGN PATENT DOCUMENTS

| 0237972 | 9/1987 | European Pat. Off. . |
| 0614289 | 9/1994 | European Pat. Off. . |
| 1-181336 | 7/1989 | Japan . |
| 1286157 | 8/1972 | United Kingdom . |
| 1487689 | 10/1977 | United Kingdom . |

*Primary Examiner*—Reinhard J. Eisenzopf
*Assistant Examiner*—Darnell Armstrong
*Attorney, Agent, or Firm*—Sughrue, Mion, Zinn, Macpeak & Seas

[57] ABSTRACT

In a communication system for transmitting and receiving burst signal between a round-trip satellite and a ground station, upon transmission of a transmitting burst signal from the round-trip satellite, a standard time upon transmission is added to the transmitting burst signal. In the ground station, the time data added to the transmitting burst data is extracted and compared with the standard time upon reception to derive a transmission delay period. A transmission timing of a burst signal to be transmitted from the own station is controlled depending upon the transmission delay period. By this, even when a distance between the ground station and the round-trip satellite is varied, overlapping of the burst signals in the time slots on the same time axis can be successfully avoided. Also, a guard time can be shortened to contribute for improvement of the transmission efficiency.

9 Claims, 8 Drawing Sheets

COMMUNICATION SYSTEM FOR VARYING TIMING OFFSET TO ACCOMMODATE VARIATION IN PROPAGATION DELAY

BACKGROUND OF THE INVENTION

1. Field of the Invention

The present invention relates to a communication system. More specifically, the invention relates to a communication system for transmitting and receiving burst signals between a round-trip (or a lower orbit) satellite and a communication station, such as a ground station and so forth.

2. Description of the Related Art

A communication system in point-to-multi-point connection for communicating through a communication satellite typically uses a stationary satellite on a geostationary orbit. There has also been proposed a system to perform communication through a round-trip satellite group.

In the recent years, it has become possible to launch small satillites economically for establishment of technology for launching small size satellites together with a large satellite associated with enlargment of the vehicle for the satellite, and also for development of a vehicle for launching the small size satellite. Accordingly, a satellite communication system employing low height level or middle height level round-trip satellite has been attracting attention.

Such a satellite communication system is advantageous in comparison with the system employing the stationary satellite with respect to lower transmission delay and downsizing of a communication terminal. For instance, Iridium project of Motrola Corporation (U. S. A.) as introduced on "Nikkei Communication," Nikkei BP K. K. Oct. 21, 1991, No. 12, pages 31 to 32 is one example of the system employing the round-trip satellite group.

Figure 5:
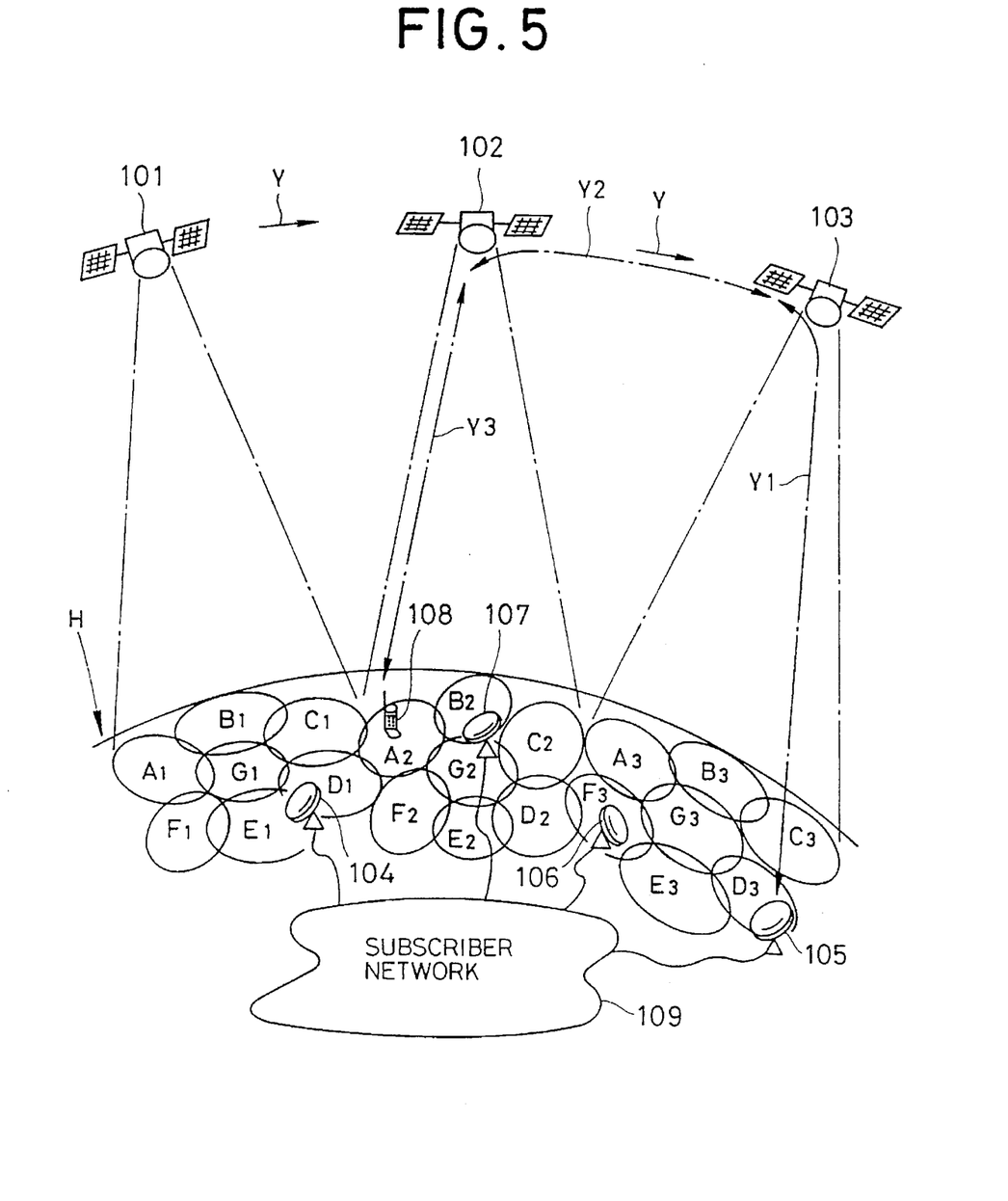
FIG. 5 is an illustration showing a general construction of a typical satellite communication system employing a low height level round-trip satellite group.

FIG. 5 shows a network construction of a typical satellite communication system employing low height level (lower orbit) round-trip satellite group. Here, 101 to 103 denote round-trip satellites, 104 to 107 denote network control stations present at least one in each area capable of communication to each of the round-trip satellites 101 to 103. The network control stations 104 to 107 serve as a gate station for connecting communication channels of the satellite to a subscriber network, charge management and management of network subscribers.

Among these, the control station 107 is a network base station managing a whole network. 108 denotes a compact communication terminal which can be hand carried or installed on a transportation means by a subscriber, and 109 denotes the subscriber network. H denotes the earth.

Each of satellites 101 to 103 are satellites moving in the direction Y with irradiating spot beams. On the terrestrial surface, cells A1 to G1, A2 to G2, A3 to G3 are formed by respective spot beams. This is why the satellite communication employing the round-trip satellite group is called satellite cellular. As is well known in terrestrial cellular, each cellular repeatedly uses several mutually different frequencies for effective use of a frequency band. Also, by using the spot beam, power of the satellite can be efficiently used. On the drawings, there is illustrated a condition where communication is performed between the communication terminal 108 and the control station 105 as shown by arrows Y1 to Y3.

Each distance between center points to the satellite is differentiated per cell. Therefore, propagation time between the communication terminal and the satellite is differentiated per cell.

Figure 6:
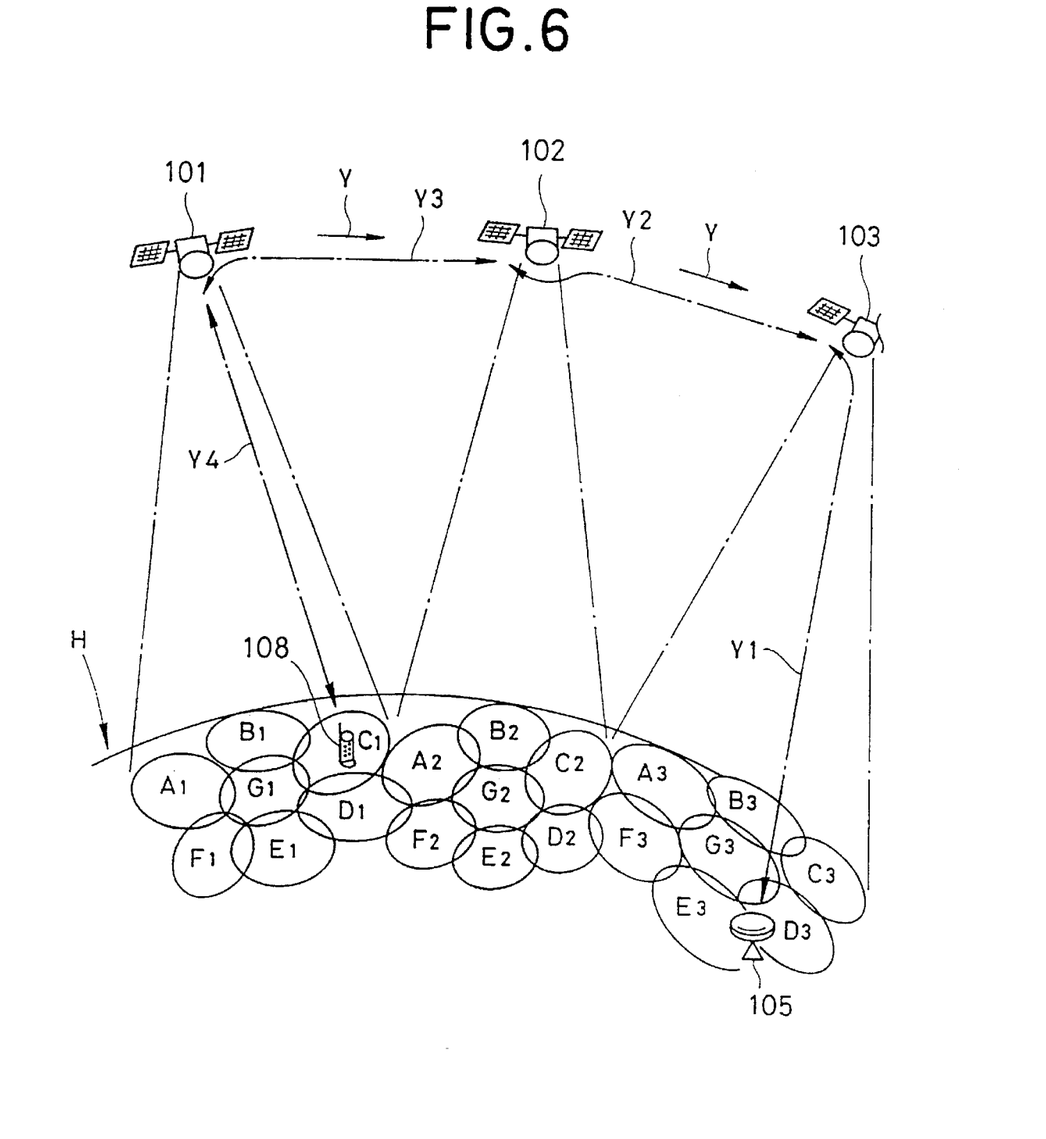
FIG. 6 is an illustration showing a general construction of the satellite communication system after elapse of a predetermined period from the condition shown in FIG. 5.

FIG. 6 shows a condition of the round-trip satellite group network after expiration a certain period from the condition of FIG. 5. Namely, due to elapse of time, respective satellites have moved. Then, the communication terminal 108 located at a position within a cell A2 of the satellite 102 becomes to be placed within the cell C1 of the satellite 101. To accommodate the change, communication as shown by arrows Y1 to Y4 is performed.

Figure 7:
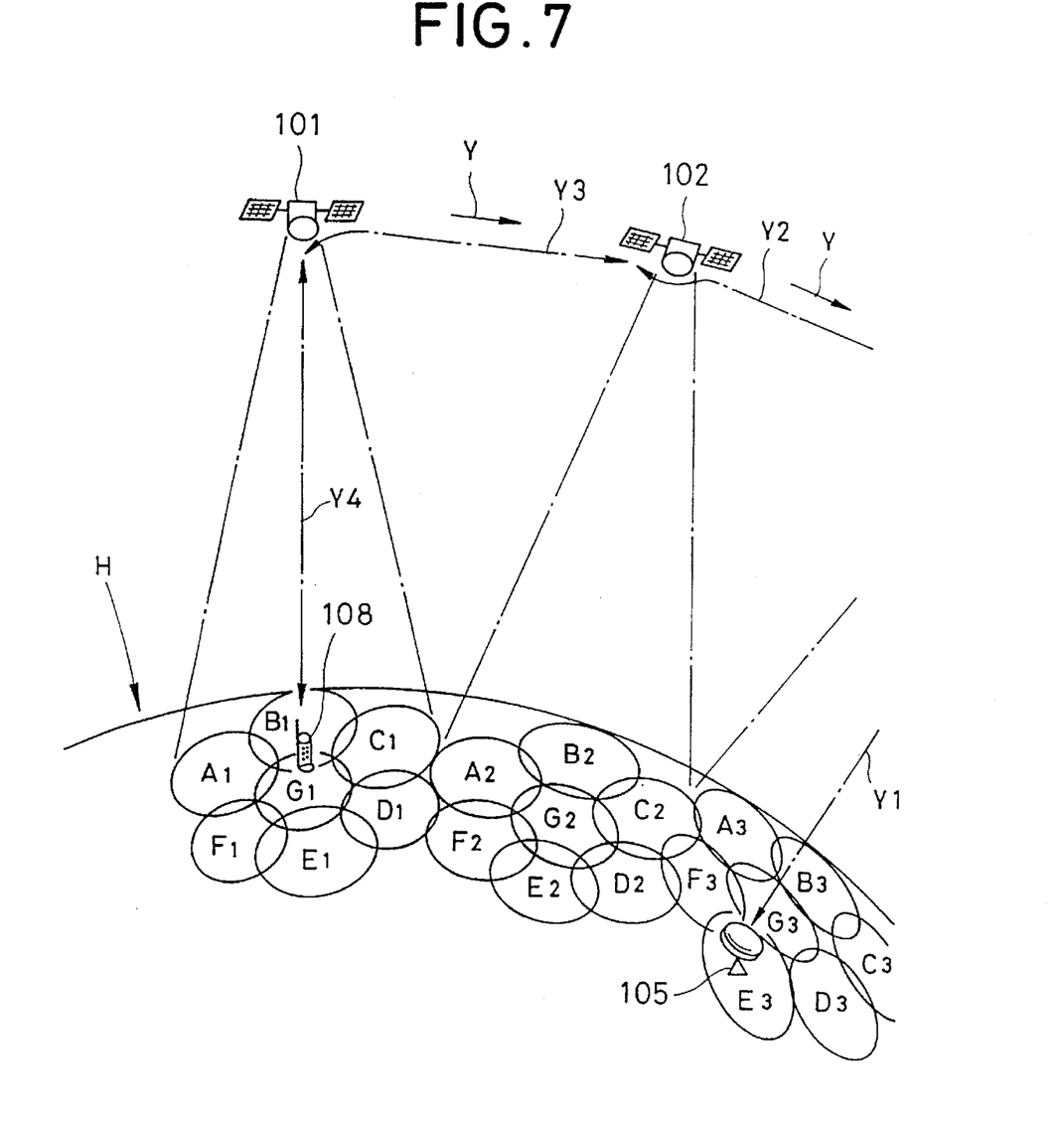
FIG. 7 is an illustration showing a general construction of the satellite communication system after elapse of a predetermined period from the condition shown in FIG. 6.

FIG. 7 shows a condition of the round-trip satellite group network after further expiration of the certain period from the condition of FIG. 6. In this condition, while the satellites have moved, the satellite to be used is held unchanged. Namely, the communication terminal 108 which initially placed within the cell C1 of the satellite 101, is now placed at the position within the cell B1 of the same satellite.

Thus, in the satellite communication system employing a low height level round-trip satellite group, when continuous communication is to be performed, since the satellite moves relative to the communication terminal, a distance between the satellite and the communication terminal under communication varies from time to time. Therefore, signal propagation delay is also varied correspondingly.

On the other hand, when the communication terminal moves, the cell in which the communication terminal is present, may change according to movement. However, this condition may also be considered that the satellite has moved relative to the communication terminal.

Here, in the satellite communication system employing the low height level round-trip satellite group, a system for dividing channel on a time axis while occupying a common frequency channel is employed. Examples include, a time-divided multi-access (TDMA) communication system or slotted aloha communication system and so forth. In these systems, a plurality of ground stations (communication terminals) distributed in a geographically wide area involved in the communication system have to transmit and receive burst signals. Accordingly, it is required that the burst signals transmitted from a plurality of ground stations are aligned on time slots in a non-overlapping manner on a time axis on the communication satellite.

In order to align the burst signals from a plurality of ground stations on a plurality of time slots in non-overlapping manner on the time axis on the satellite, it becomes necessary to accommodate all of differences of propagation delay of the ground stations spread in wide area. For this purpose, it may be considered to set a guard time as long as possible in a unit time slot. However, this clearly degrades data transmission efficiency. Therefore, it becomes necessary to optimally adjust a "time shift" of a transmission timing to transmit the burst signal depending upon the magnitude of the propagation delay.

This will be discussed with reference to the drawings.

Figure 8:
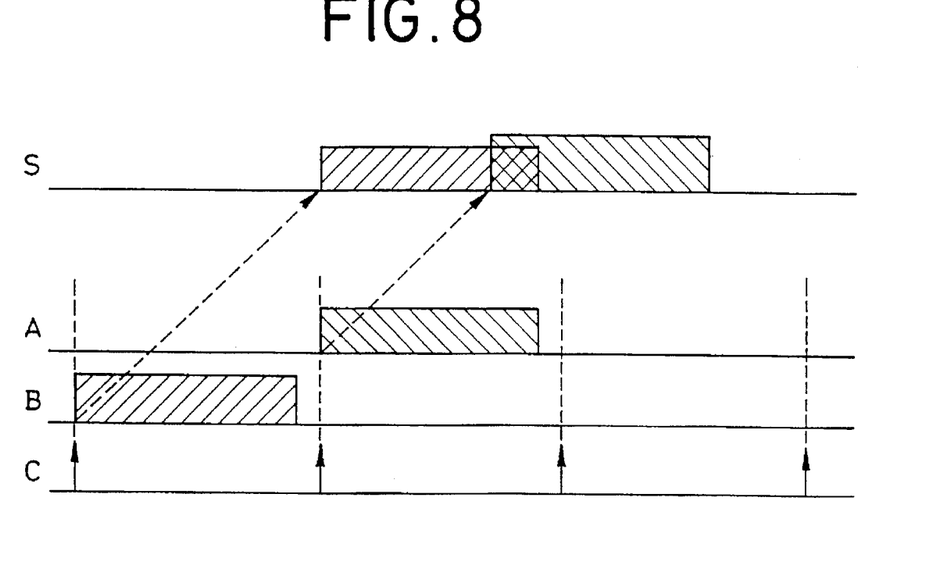
FIG. 8 is a timing chart showing the case where burst signals are transmitted from a plurality of ground stations at different locations according to a common reference transmission timing.
Figure 9:
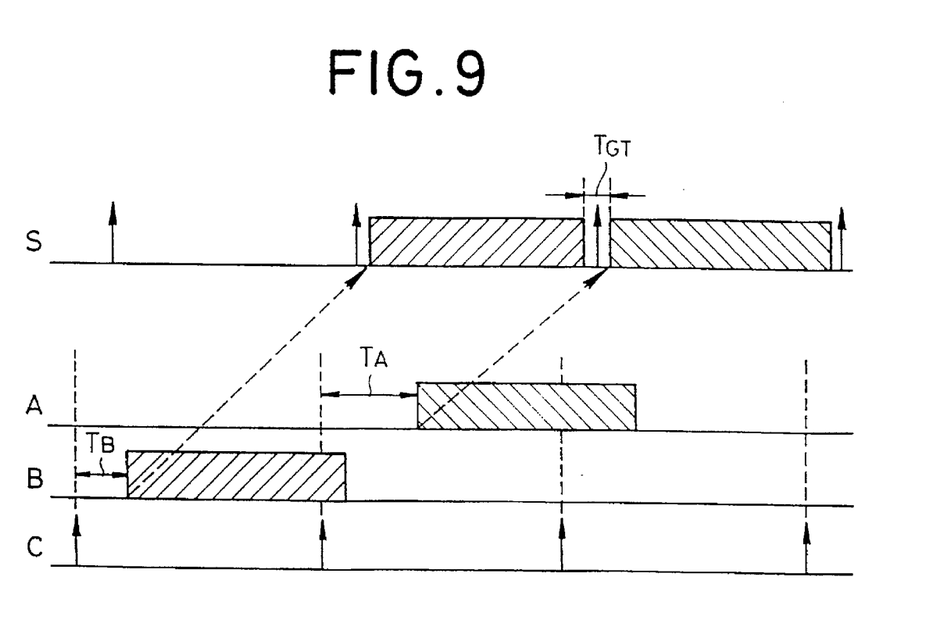
FIG. 9 is a timing chart showing the case where burst signals are transmitted from a plurality of ground stations at different locations with adding to an own specific offset magnitude to a common reference transmission timing.

FIGS. 8 and 9 are explanatory illustrations for aligning the burst signals on a plurality of time slots on the time axis on the communication satellite.

FIG. 8 shows the case where ground stations located at different places transmit the burst signals (hatched portions) according to a common reference transmission timing C. In this case, due to difference of the propagation periods to the communication satellite S from the grounding stations A and B, the burst signals are aligned on a plurality of time slots in partially overlapped condition on the time axis of the satellite S.

FIG. 9 shows the case where the ground stations located at different places transmit the burst signals (hatched portions) by adding own specific offset magnitudes TA and TB for the reference transmission timing C. In this case, even when the propagation delays from the ground stations A and B to the satellite are different, the burst signals may be aligned on a plurality of time slots without causing overlap on the time axis of the satellite S. It should be noted that TGT is a guard time between the burst signals.

Conventionally, the above-mentioned offset magnitude is linearly determined as a fixed values depending upon the positions of the ground stations, as set out in Japanese Unexamined Patent Publication (Kokai) No. Heisei 1-181336, left upper column, line 18 to right upper column, line 10.

When it is desired to continuously perform communication in the communication system employing low height level round-trip satellite group, since the satellites sequentially move relative to the communication terminal, the distance between the satellite and the communication terminal is varied according to elapsing of the time period. Thus, the propagation delay of the signal is varied.

In order to accommodate variation of the propagation delay, it has been considered that the guard time TGT between the burst signals be increased. However, this inherently causes significant degradation of the transmission efficiency. Therefore, as set forth above, even when the burst signal is transmitted with the addition of a specific offset in a common reference timing, if the offset magnitude TA and TB in FIG. 9 are the fixed values, it cannot be adopted to vary with propagation delay according to elapsing of the time. Therefore, burst signals may cause mutual collision on the time axis of the communication satellite, to make it impossible to align the burst signals on a plurality of time slots.

SUMMARY OF THE INVENTION

It is an object of the present invention to provide a communication system which can solve the drawbacks in the prior art as set forth above and successfully avoid mutual collision of burst signals without causing lowering of the transmission efficiency.

According to the first aspect of the invention, a communication system is provided for performing communication with a burst signal between ground stations via a communication satellite, comprising:

the communication satellite including:
  a first clock generating means for generating a time data matching with a standard time of the ground station; and
  transmission means for transmitting the burst signal to be transmitted by adding a time data of the first clock generating means;

each of the ground stations including:
  a second clock generating means for generating a time data matching the standard time;
  receiving means for receiving the burst signal transmitted from the communication satellite;
  comparing means for comparing the time data added to the burst signal received by the receiving means and the time data of the second clock generating means; and
  transmitting means for transmitting the burst signal to be transmitted from one station to the communication satellite while controlling a transmission delay period depending upon the result of comparison by the comparing means.

According to the second aspect of the invention, a communication system is provided for communication between ground stations with a burst signal through a communication satellite, comprising:

the communication satellite including:
  a first clock generating means for generating a time data matching with the standard time of the ground station; and
  transmission means for transmitting the burst signal to be transmitted by adding a transmitting frame timing signal and a time data of the first clock generating means;

each of the ground stations including:
  a second clock generating means for generating a time data matching the standard time;
  receiving means for receiving the burst signal transmitted from the communication satellite;
  reference timing signal generating means for extracting the frame timing signal added to the reception burst signal received by the receiving means and generating a reference timing signal determining a transmission timing of a transmitting burst data of one station;
  time data extracting means for extracting the time data added to the reception burst signal on the basis of the reference timing;
  comparing means for comparing the extracted time data and the time data of the second clock generating means; and
  transmitting means for transmitting the burst signal to be transmitted from one station to the communication satellite with providing a delay for a delay period depending upon the result of comparison by the comparing means.

BRIEF DESCRIPTION OF THE DRAWINGS

The present invention will be understood more fully from the detailed description given below and from the accompanying drawings of the preferred embodiment of the invention, which, however, should not be taken to limit the present invention, but are for explanation and understanding only.

In the drawings.

DESCRIPTION OF THE PREFERRED EMBODIMENT

The present invention will be discussed in terms of the preferred embodiment with reference to the accompanying drawings, particularly to FIGS. 1 to 4.

Figure 1:
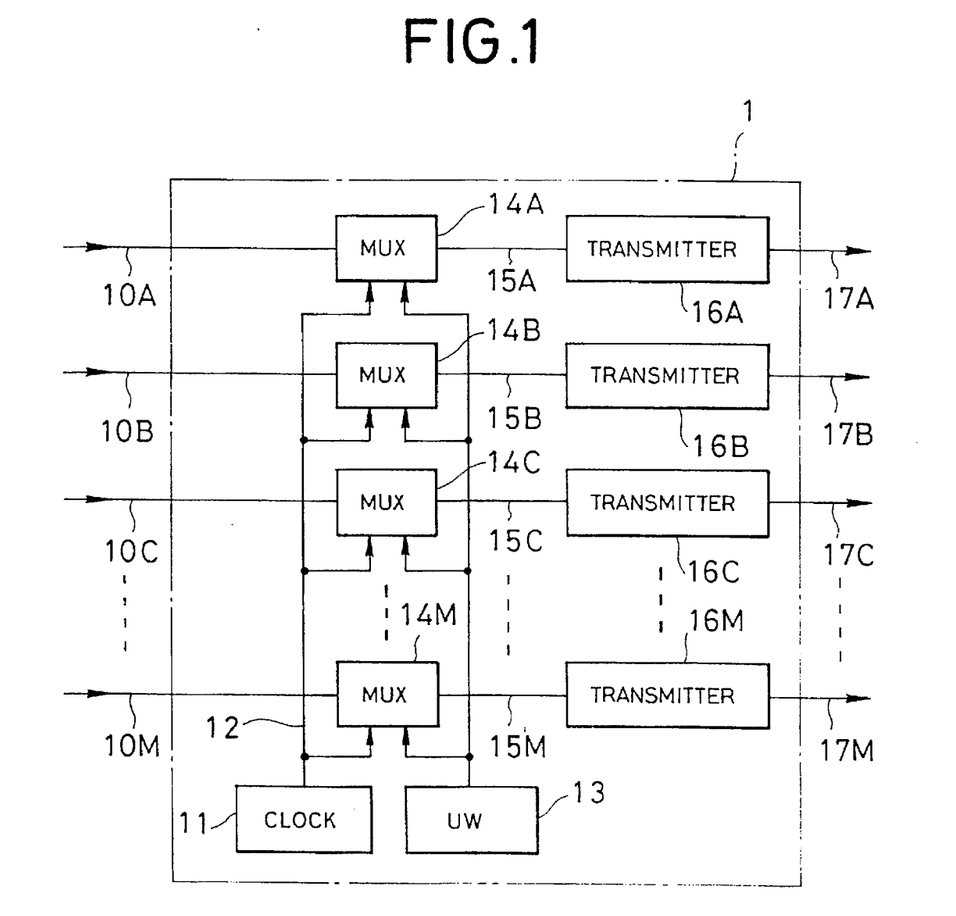
FIG. 1 is a block diagram showing a construction of the major part of a round-trip satellite in the preferred embodiment of a communication system according to the present invention.
Figure 2:
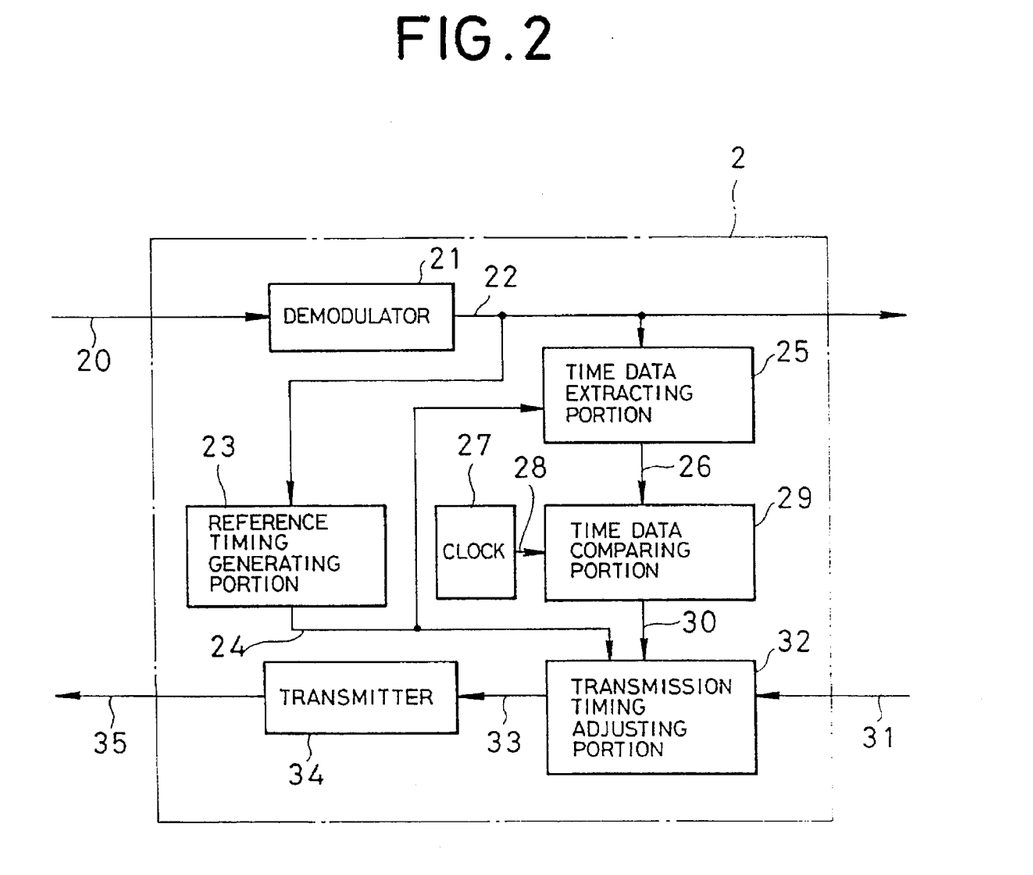
FIG. 2 is a block diagram showing the major part of a ground station in the preferred embodiment of a communication system according to the present invention.

FIGS. 1 and 2 are block diagrams of the preferred embodiment of a communication system according to the present invention. FIG. 1 shows the major portion of a round-trip satellite, and FIG. 2 shows the major portion of a ground station.

In FIG. 1, round-trip (or lower orbit) satellites 1 in the shown embodiment are satellites having M number of spot beams A, B, C, ..., M. The round-trip satellites 1 take transmission data 10A, 10B, 10C, ..., 10M independently input to respective spot beams as inputs, and transmit spot beam outputs 17A, 17B, 17C, ..., 17M.

The shown embodiment of the round-trip satellites 1 are provided with composite portions (MUX) 14A, 14B, 14C ..., 14M corresponding to transmission data 10A, 10B, 10C, ..., 10M, and transmitters 16A, 16B, 16C, ..., 16M receiving corresponding outputs 15A, 15B, 15C, ..., 15M corresponding to respective composite portions and transmitting through modulation and amplification.

Furthermore, each of the round-trip satellites 1 is constructed to have a clock portion 11 transmitting a time data consistent with a standard time on the earth, and a unique word generating portion 13 transmitting an unique word (UW) indicative of a timing reference. Time data and unique word transmitted therefrom are inserted to corresponding transmission data 10A to 10M by the composite portions 14A to 14M.

On the other hand, in FIG. 2, the ground station 2 in the shown embodiment, is adapted to receive a modulation wave signal 20 transmitted from the round-trip satellites, and is constructed with a demodulator 21 receiving the signal 20 and performing a demodulating operation, and a reference timing generating portion 23 detecting the unique word periodically inserted in the output data 22 of the demodulator 21 and generating a reference timing signal 24 to be the reference for transmission.

Furthermore, the ground station 2 in the shown embodiment is constructed with a clock portion 27 transmitting a clock data 28 consistent with the time data transmitted by the clock portion 11 in the round-trip satellites 1, a time data extracting portion 25 extracting the time data periodically inserted in the output data 22 of the demodulator 21 employing the reference signal 24, and a time data comparison portion 29 comparing the extracted time data 26 with a time data 28 generated by the clock portion 27 and outputting a time difference 30.

Furthermore, the ground station 2 of the shown embodiment comprises a transmission timing adjusting portion 32 deriving an offset amount by subtracting the time difference 30 output from the time data comparison portion 29 from the fixed value and transmitting a transmission data 31 to be transmitted at a timing delayed from the reference timing by the reference timing signal 24 in a magnitude corresponding to the offset amount, and a transmitter 34 receiving the output 33 of the adjusting portion 32 and transmitting the same with modulation. The output 34 is transmitted to the round-trip satellite.

The operation of the preferred embodiment of the communication system including the round-trip satellites 1 and the ground stations 2 constructed as set forth above, will be discussed as follow. At first, in FIG. 1, the round-trip satellites 1 irradiate M spot beams and have transmitters 16 respectively corresponding to the spot beams. Also, the round-trip satellite internally includes clock portion 11 consistent with the normal time on the earth.

Respective transmission data 10A to 10M to be transmitted from respective spot beams are input to respective composite portion (MUX) 14A to 14M and are periodically inserted the time data 12 of the clock portion 11 and the unique word as the frame period signal indicative of the reference timing of the burst transmission in the ground station.

Figure 3:
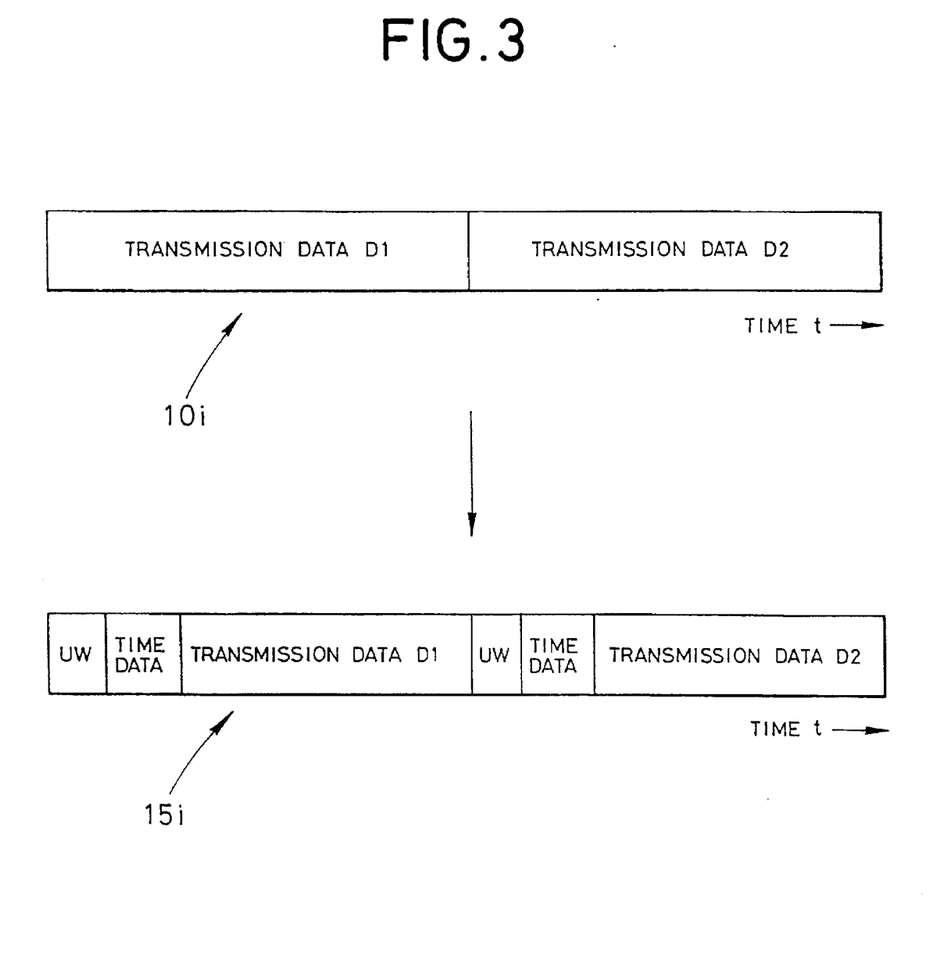
FIG. 3 is a conceptual illustration showing the case where a unique word and time data are inserted in a transmission data.

FIG. 3 shows an example, in which the unique word (UW) and the time data are inserted in the transmission data $10i$ ($i$=A to M). The transmission data inserted the unique word and the time data, namely the outputs $15i$ ($i$=A to M) of the composite portion 14A to 14M are fed to the transmitters 16A to 16M and then output with modulation and amplification. It should be noted that respective transmission data D1 and D2 are compressed in time axis.

Thus, since the time data at the time of transmission is inserted in the transmission data, the propagation delay period from the satellite can be measured by extracting the data in the ground station receiving the transmission data and comparing the extracted data with the time upon reception of the data. Namely, the difference of these times represents the propagation delay period from the satellite to the ground station, which propagation delay period becomes greater when the distance between the satellite and the ground station is large and becomes smaller when the distance is smaller.

Accordingly, by transmitting a burst signal by providing a delay from the reference timing for the offset amount corresponding to the propagation delay period, overlap of the bursts in the time slots on the satellite can be avoided. As a result, a guard time can be shortened. This effect in the ground station will be discussed hereinafter.

In FIG. 2, the ground station 2 demodulates the reception input 20 as the modulation wave by the demodulator 21 to attain the reception data 22. The reference timing generating portion 23 detects the unique word from the reception data 22 to generate the reference timing 24. Normally, this is performed by employing a technology for establishing frame synchronization.

On the other hand, the time data extracting portion 25 receives the reception data 22 and extracts the time data 26 inserted in the reception data 22 according to the reference timing 24. The time data comparing portion 29 compares the extracted time data 26 and the time data (time data upon reception) from the clock portion 27 provided in the ground station 2 and outputs the time difference 30 (TDIF). Here, the clock portion 27 in the own station is of course matched with the same standard time to the clock portion 11 of the round-trip satellite 1.

The transmission timing adjusting portion 32 receives the time difference TDIF output from the time data comparing portion 29, calculates a value by subtracting a delay in reciprocation (2×TDIF) from the fixed value TREF and sets the resultant value as the offset period TOFS. Then, the transmission data 31 is delayed from the reference timing 24 for the magnitude of the offset period TOFS. Namely, the offset period TOFS can be expressed by:

$$TOFS=(TREF)-(2\times TDIF) \quad (1)$$

Here, the fixed value TREF is the specific value determined with respect to the communication system and is a value derived by adding the Guard time TGT to a integer multiple of a slot length TSLOT. Namely, the fixed value may be expressed by:

$$TREF=(N\times TSLOT)+(TGT) \quad (2)$$

Figure 4:
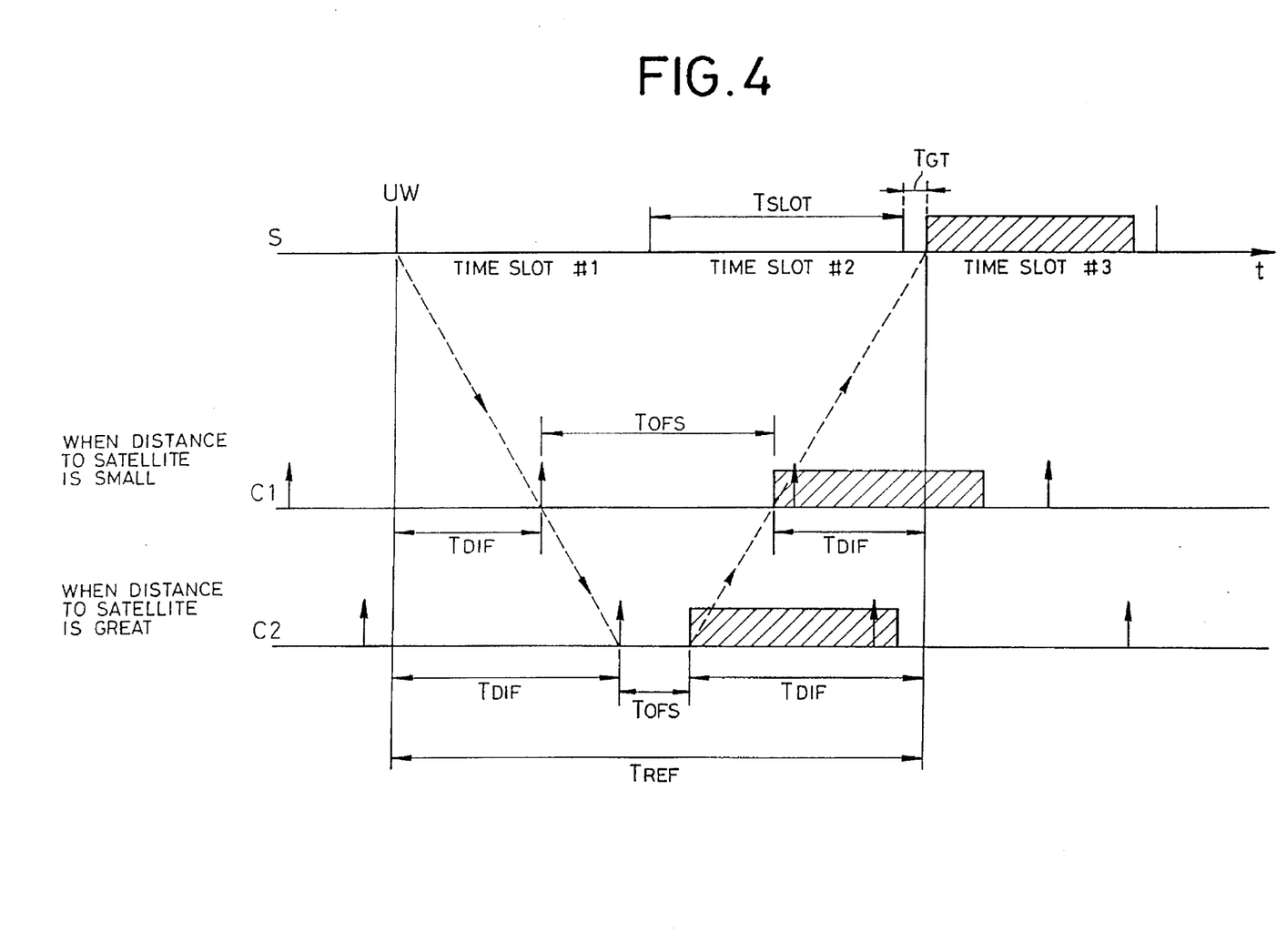
FIG. 4 is a timing chart showing the operation of the preferred embodiment of the communication system according to the invention.

The operation will be discussed with reference to FIG. 4. The reference timing to be generated by detecting the unique word transmitted from the satellite is delayed at greater magnitude as the distance between the ground station and the satellite. In FIG. 4, it should be appreciated that when the ground station 2 transmits the burst signal to the third time slot No. 3, it becomes necessary to provide an offset from the reference time for a period derived by subtracting the propagation delay period required for reciprocation of the transmitted data to and from the satellite, namely double of TDIF (2×TDIF), from the fixed value TREF derived by adding the guard time TGT to the period of double of the slot length TSLOT for transmitting to the average position of the time slot.

When the distance to the satellite is shorter (reference transmission timing signal is shown as C1), the offset period TOFS becomes greater. Namely, when the difference TDIF of the time data is small, the offset period TOFS derived through the foregoing equation (1) becomes greater.

In contrast, when the distance to the satellite is greater (the reference timing signal is shown as C2), the offset period TOFS becomes smaller. Namely, since the difference TDIF between the time data is greater, the offset period derived through the foregoing equation (1) becomes smaller.

As set forth above, the transmission timing adjusting portion 32 performs transmission of the burst signal (hatched portion) with a delay for the offset period TOFS.

The transmitter 34 receives the transmission data 33 as the burst signal delayed by the transmission timing adjusting portion 32 and outputs the same with modulation.

As set forth above, in the round-trip satellite of the round-trip satellite system, the transmission data is transmitted with inserting the unique word and the time data of the transmission timing. Then, in the ground station, the time data is extracted from the received data and is compared with the time data upon reception so that transmission of the transmission data is delayed in the offset amount corresponding to the difference of the time data. Therefore, even in the round-trip satellite system, in which the propagation delay varies from time to time, the burst signals will never overlap to each other in the time slot. Therefore, the guard time can be significantly reduced. Therefore, transmission efficiency can be remarkably improved.

It should be noted that, while the foregoing embodiment has been discussed only for the case where the communication stations are the round-trip satellite and the ground station, the present invention should not be limited to the shown construction but is applicable for in the wide area, where the burst signals are exchanged between the communication stations.

As set forth above, according to the present invention, it becomes possible to construct the communication system which measures the transmission delay period from the first communication station to the second communication station to provide a delay in transmission of data from the second communication station to the first communication station to successfully avoid collision of the burst signals. Also, by shortening the guard time, transmission efficiency can be significantly improved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which fall within the scope encompassed and equivalents thereof with respect to the feature set out in the appended claims.

What is claimed is:

1. A communication system for performing communication with at least one burst signal between ground stations via a communication satellite, said system comprising:

said communication satellite including:

a first clock generating means for generating a first time data corresponding to a standard time of said ground station; and transmission means for adding said first time data to transmission signals to form the burst signal and for transmitting the burst signal;

each of said ground stations including:

a second clock generating means for generating a second time data corresponding to said standard time;

receiving means for receiving the burst signal transmitted from said communication satellite;

comparing means for comparing said first time data added to the burst signal and received by said receiving means with said second time data of said second clock generating means; and transmitting means for transmitting the burst signal to be transmitted from a respective ground station to said communication satellite and for controlling a transmission delay period depending upon the result of comparison by said comparing means.

2. A communication system as set forth in claim 1, wherein said transmitting means of said ground station doubles the result of comparison by said comparing means, derives an offset value by subtracting the doubled value from a predetermined fixed value, and sets said offset value as said transmission delay period for the burst signal to be transmitted.

3. A communication system as set forth in claim 2, wherein said fixed value is an integer multiple of the length of a time slot to be superimposed on the burst signal and a guard time length added thereto.

4. A communication system as set forth in claim 1, wherein said communication satellite is a lower orbit satellite.

5. A communication system for performing communication between ground stations with at least one burst signal through a communication satellite, said system comprising:

said communication satellite including:

a first clock generating means for generating a first time data corresponding to a standard time of said ground station; and transmission means for adding a transmitting frame timing signal and said first time data of said first clock generating means to transmission signals to form the burst signal and for transmitting the burst signal;

each of said ground station including:

a second clock generating means for generating a second time data corresponding to said standard time;

receiving means for receiving the burst signal transmitted from said communication satellite;

reference timing signal generating means for extracting said frame timing signal added by said satellite transmission means and received by said receiving means and for generating a reference timing signal for determining a transmission timing of a transmitting burst data of a respective ground station;

time data extracting means for extracting said first time data added by said satellite transmission means on the basis of said reference timing;

comparing means for comparing the extracted time data and said second time data of said second clock generating means; and transmitting means for transmitting the burst signal to be transmitted from a respective ground station to said communication satellite and for providing a delay for a delay period depending upon the result of comparison by said comparing means.

6. A communication system as set forth in claim 5, wherein said transmitting means of said ground station doubles the result of comparison by said comparing means, derives an offset value by subtracting the doubled value from a predetermined fixed value, and sets said offset value as said transmission delay period for the burst signal to be transmitted.

7. A communication system as set forth in claim 6, wherein said fixed value is an integer multiple of the length of a time slot to be superimposed on the burst signal and a guard time length added thereto.

8. A communication system as set forth in claim 5, wherein said communication satellite is a lower orbit satellite.

9. A communication system as set forth in claim 5, wherein said transmitting frame timing signal is a unique word.

* * * * *